Aug. 2, 1960

C. A. BADEAU ET AL 2,947,800

INSULATED ELECTRICAL RACEWAY FITTING

Filed Oct. 10, 1955

INVENTORS.
CARROLL A. BADEAU
WALTER H. WEBER

BY James C. Ledbetter

ATTORNEY.

Aug. 2, 1960
C. A. BADEAU ET AL
2,947,800
INSULATED ELECTRICAL RACEWAY FITTING
Filed Oct. 10, 1955
5 Sheets-Sheet 5
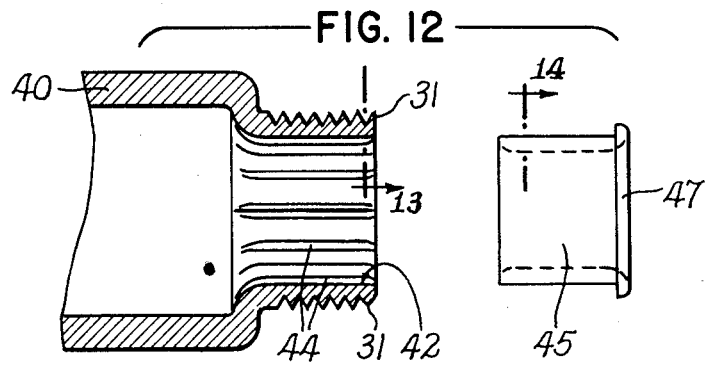
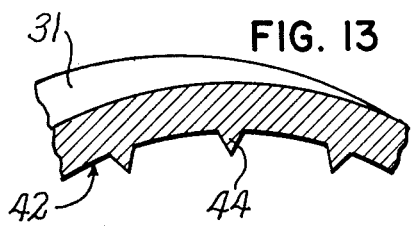
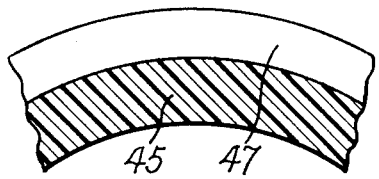
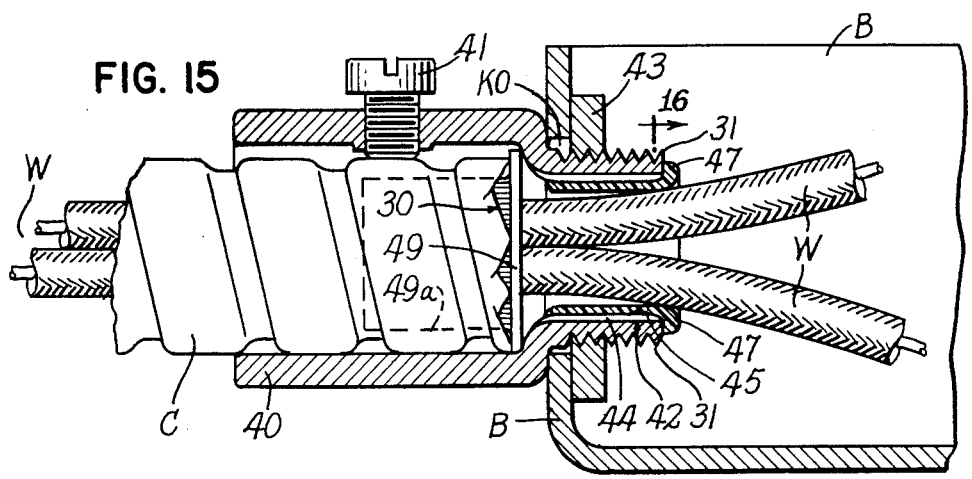
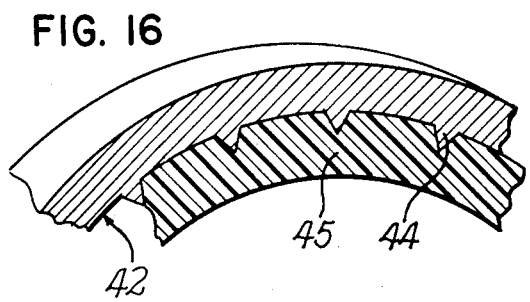
INVENTORS
Carroll A. Badeau
Walter H. Weber
BY
James C. Ledbetter
ATTORNEY FIG. 17
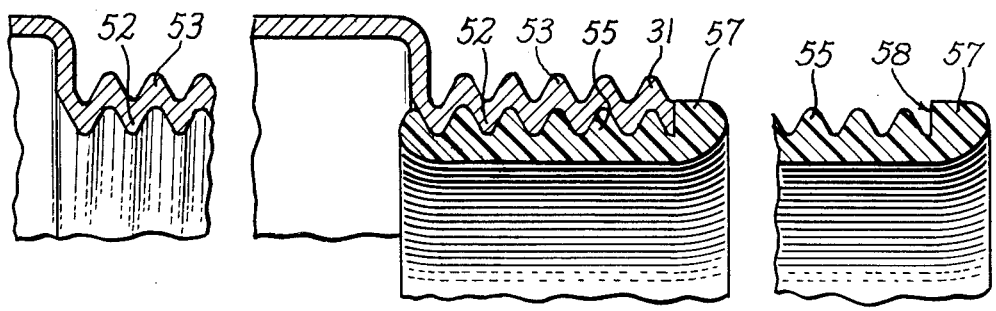
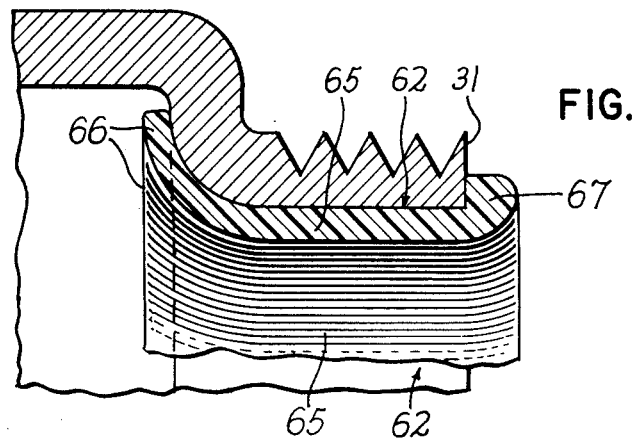
FIG. 18
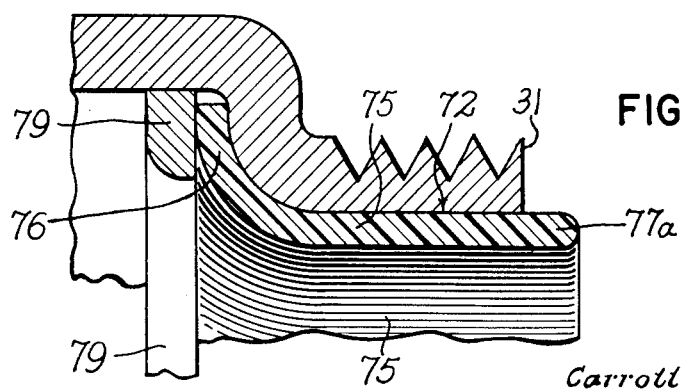
FIG. 19

Aug. 2, 1960

C. A. BADEAU ET AL 2,947,800

INSULATED ELECTRICAL RACEWAY FITTING

Filed Oct. 10, 1955

INVENTORS
Carroll A. Badeau
Walter H. Weber
BY
James C. Ledbetter
ATTORNEY

United States Patent Office 2,947,800
Patented Aug. 2, 1960

2,947,800

INSULATED ELECTRICAL RACEWAY FITTING

Carroll A. Badeau, Westfield, and Walter H. Weber, Metuchen, N.J., assignors to The Thomas & Betts Co., Elizabeth, N.J., a corporation of New Jersey Filed Oct. 10, 1955, Ser. No. 539,567

3 Claims. (Cl. 174—83)

The invention herein relate to insulated electrical raceway fittings, which are novel in respect to their several functional advantages derived from permanently built-in and integrated seamless insulating throat liners, out through which insulation-covered conductors protectively emerge in an improved manner into the open from the conduiting of conventional raceways.

This is a continuation-in-part of our parent application filed June 15, 1951, Serial No. 231,824, now abandoned in favor of the present application.

Conventional raceway throated fittings of the class herein improved have three conventional functions: they terminate the raceway run (open end of a conduit), also provide mechanical connections (joints) for and between the raceway components, and make grounding (electrical) connections for and between the joined components. To these three, the basic invention of the parent application and its subsequent improvements herein now bring several additional functional advantages for the general betterment of raceway fittings (connectors, couplers, and bushings) adapted to the several types of conduits used in raceway work by the electrical building trade.

Fittings of this throated type are used in assembling raceways for protectively enclosing electrical conductors (wiring), the insulation-covering of which insulates the electrically charged wiring from the conduits and boxes and also from the metallic throats of fittings in conventional use. As well known, all raceways are conductively grounded to the earth as a safety measure. Raceway components are, of course, necessarily metallic for the purpose of providing a current path to the earth along the raceway run.

Accordingly, the metallic fittings of the class herein may be said to be intended as non-conductive since they are dielectrically isolated from the current-charged wiring by virtue of the insulation-covering on the latter. However, in the event the insulation-covering fails, it follows that the metallic raceway system becomes electrically charged (due to short circuit or other misoperation of the installation), whereupon the metallic components of the raceway assembly must conduct (ground) the misdirected electrical charge to earth. As well known, it usually is the metallic throat which causes the failure.

Briefly, the foregoing are functions of conventional raceway fittings, of which there are several species. Their characteristic dual functions—on the one hand, intended as nonconductive for safely enclosing the insulation-covered electrical power lines and, on the other hand, being ground conductive in the event of misoperation—taken all together, pose problems yet unsolved that bid for new discoveries which, if worth while to the trade, must be characterized by ultra simplicity of structure, method and economy in manufacture.

Accordingly, the inventions herein provide smooth and frictionless-surface dielectric interliners positively laminating the metallic throats of electrical raceway fittings where the wiring loosely and freely emerges therefrom into the open. Such interlined fittings of the cable connector type enhance the utility of spiral-armor raceways (BX cable and flexible-metallic conduit) and also of non-metallic sheathed cable. In number, there are five types of raceway conduiting, and these three are flexible types, of which the two spiral-armors pose particular problems.

Especially, an insulating problem exists in the raceway use of flexible spiral-armor conduiting inside of a cable connector (gripping and holding the armor in a box) where the wiring emerges from the rough end of the armor and enters the connector body. What is known as an "anti-short bushing" is inserted by a workman on the job (under strict requirements) into the armor end and around the wires to protect the insulation-covering thereof from damage by metallic roughness and prick points on the end of the armor.

It is well known that an anti-short bushing (a red fibre sleeve) is distinctly unrelated in function and structure to a spiral-armor connector, although used with it. Such distinction may be a reason why the art has not yet (so far as known) supplied the trade with an improved spiral-armor connector which might lead to a modification of the present day anti-short bushing requirements. The parent invention and its improvements herein are believed to be a step forward in that respect.

Returning to the subject of the number of types of raceway conduiting involved, it is pointed out that the new interlined fittings herein of the bushing type for thick-wall rigid conduit (pipe) as well as interlined connectors for thin-wall electric-metallic tubing (EMT) greatly enhance the utility of these two rigid types of conduiting. Therefore, it is seen that the electrical building trade has available five species of raceway; and this invention is a studied effort to improve the several types of fittings therefor.

The new dielectric interliners herein are provided at provided at the danger points (the metallic throat area and the metallic throat rim-edge of a fitting), where the live conductors emerge loosely from one or another of the above various raceways (especially the four metallic types) thus where they come out in the open, and where the insulation-covered wiring is no longer protected by the raceway. From this terminal point (the open metallic throat and edge of the fitting), the conductors may enter a raceway-wiring box (outlet, junction, pull, or other type of metallic box), or the conductors may extend from the throat to the terminals of a wiring panel, an electric motor, or other apparatus.

The metallic throat of the conventional raceway fitting is the more critical danger point in all electrical raceway systems, as regards the potential hazards of short circuits and fires. The throated fitting (connector, coupler, bushing, etc.) is at the juncture (joint) of the metal wiring box and the conduit run of the raceway. It is at this juncture and potential danger point that the wiring is exposed, worked, pulled, bent and twisted (by workmen making the installation), where the wiring emerges from the protective run of the raceway and comes out in the open.

The exposed insulation-covered conductors (or the ends thereof), no longer enclosed in the raceway run, extend loosely through the metallic throat and quite closely (in free rubbing contact) to the metal parts of a box connector or other fitting. Their throated hubs are usually screw-threaded; and the metallic throats frequently have burrs, sharp metal edges, thread slivers, and/or other roughness on their surfaces, which cause pricking, abrasion and wear of the insulation-covering on the electrical wiring. Such wear starts deterioration and eventually may result in a break of the insulation covering, thereby causing a short circuit.

It is at the critical juncture (joint) of the box and raceway run that an insulating tubular interliner in the throat of the metallic fitting improves the installation. The liner protectively masks and isolates the metallic burrs and jagged edges of the rough throat surface. Such liner seals off the metallic surface and provides a positively smooth dielectric passage and exit rim, out through and against which, initially, the insulation-covered conductors are fished and dragged during installation and, eventually, upon which they sag, rest and may vibrate, without wear during long service, if the metallic throat has the new laminate lining of these inventions.

During installation, the wiring is subjected to rough handling, such as bending, kinking and twisting under tension at and against the exit rim (end-edge) of the throat, i.e., the terminus of the raceway. These manual operations may and often do inflict unnoticed cracks, abrasion and strains (thus latent damage) in and to the conductor insulation-covering. Thereafter, during long service, the current may leak through to the annular metallic throat of the conventional fitting, thus causing the short circuit aforementioned.

One method by which the rough metallic throat surface (as for example, that of a rigid conduit bushing) may be masked is for the workman on the job to insert a longitudinally-slit insulating sleeve into the metallic bushing throat or rim. Such a sleeve may fasten itself in the bushing throat by its inherent expansive pressure. Latching tabs on the slit sleeve, to grip and hold it expanded within the bushing throat, have been tried.

There are other fastening expedients which provide uncertain results since a cut or multilated sleeve may fail to fully line the metallic throat of a rigid conduit bushing. At best, the conventional masking sleeves are not seamless and, therefore, do not have the functional advantages of built-in and integrated insulating tubular liners (full fashioned and permanently laminated) within the metallic throats of the several fittings.

The trade has learned (more so than the patent art) that the conventional types of throat insulating sleeves— intended to be inserted by a workman on the job—lack the advantage of self-insulated, full-fashioned, seamless interliners built into the fittings during manufacture. Known types of insulating sleeves, which are slit for manual insertion into the rough metallic bushing throat, may lack coverage at the slit, or at their latching tab portions, and are not positive insulators.

Moreover, the conventional types of liner sleeves may be jerked out of the metallic bushing throat when the wiring is initially dragged through the rigid conduit. If not, such a sleeve may become loosened or dislodged from the rigid conduit bushing when the wires are subsequently bent and manipulated against it in making electrical connections and doing other work on a job. Therefore, the displaced liner sleeve exposes the insulation-covering of the electrical conductors to the metallic throat in the fitting and eventually causes a short circuit and grounding mishap to the system.

Finally, it is pointed out that raceway systems employ "ground connectors" in many instances at the wiring boxes. It is an additional fitting, in the nature of an electrical connector as such. The ground connector establishes a good conductive connection between the box and the metallic conduit to assure "grounding" in case of short circuit mishap. It is an additional part to install and adds its particular problem to raceway work.

Briefly, the foregoing outlines some of the conditions confronting the electrical building trade, whether in new installations or in repair of old-house raceway work. Thus, problems are posed for solution and brings one to inquire of the overall purposes of these inventions. The purposes will be better understood by a consideration of this disclosure as a whole and by comparing it to the prior art in particular. However, as understood at this time, they may be summarized thus:

(1) To produce cable connectors for flexible spiral-armor conduiting (BX cable and flexible-metallic conduit), the dielectric tubular liners of which perform all those functional advantages inherent in the liner throat portion 15 per se and its annular end portions 16 and 17 (parent drawings, Figs. 1–5, identified in the second paragraph herein), thus improving raceway systems and enhancing the utility of the three conventional functions (third paragraph herein) of fittings therefor;

(2) In particular, to provide further improved ways and means of laminating tubular liners into tubular metallic bodies, other than and in addition to the snap-lock or shoulder-lock fastening flange-and-bead means 16, 17 originally disclosed in the parent drawings (Figs. 1–5 herein);

(3) To produce a new cable connector for spiral-armor flexible conduiting which contributes to or may be a solution of the anti-short bushing problem and to simplify that aspect of armored raceway wiring installations;

(4) To produce rigid conduit bushings (parent Figs. 6, 7 and 8) having laminate dielectric tubular or ring-like liners permanently integrated into their metallic throats, thus self-insulated, in order to eliminate the old practice of stocking and carrying to the job loose parts (conventional liner sleeves for bushings) which a workman may overlook and thus fail to install; and (5) To produce conduit fittings which simplify the "ground connector" problems involved in raceway work.

The foregoing and other purposes will be more fully understood by reference to the parent drawings showing the basic invention and to the continuation-in-part drawings showing newly discovered equivalent means for integrating tubular liners within the metallic throats of raceway fittings.

THE DRAWINGS

The accompanying drawings and this specification, as well as the claimed subject matter, disclose the inventions as preferred and embodied at this time for understanding the problems sought to be solved.

Sheet 1 is the parent case drawing showing the first two species of the invention. Figs. 9, 10 and 11 are enlarged fragmentary action views demonstrating the several functional advantages inherent in the cable connector of the first five views on Sheet 1. These eight views feature a spiral-armor connector improved by this invention.

The four new sheets of drawings disclose five additional species of the invention devoted to like functional advantages but implemented by different forms of laminate tubular liners, beginning with new Fig. 12. Accordingly, seven species are presented.

It is seen that the cable connector (Figs. 1 through 5, also 9, 10, 11 and 23), as well as the rigid-conduiting bushing (Figs. 6, 7 and 8), are all based upon the parent filing date of June 15, 1951. New Figs. 12 through 22 are continuing parts based on the new filing date hereof.

All the drawings herein are developed from trade-size commercial specimens, and some of the new views are made to larger scale than the specimens in order to illustrate small parts and emphasize the several functional advantages inherent in the construction shown in parent Sheet 1.

Fig. 1 shows a tubular, dielectric, seamless liner preformed (as by pre-molding it) ready for permanent insulative integration into the externally screw-threaded metallic throat of the connector body by the manufacturing technique herein.

Fig. 2 shows the liner and connector being assembled, i.e., the liner being forced into the tubular metallic body.

Fig. 3 shows the completed connector, with its built-in liner in permanent position.

Fig. 4 shows an enlarged fragment of the inner or front end of the liner, to bring out details of its annular beaded and chamfered end.

Fig. 5 shows the lined connector joining a spiral-armor conduit with a raceway wiring box. Hence this view shows the juncture of the raceway run and box, being that critical danger point in a raceway assembly heretofore emphasized.

Figure 1:
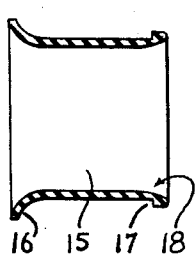
Figs. 1–5 illustrate the invention embodied in a typical cable connector for spiral-armor types, i.e., BX cable and flexible-metallic conduit but, in fact, useful with non-metallic sheathed cable and also with thin-wall electric-metallic tubing known as EMT.
Figure 2:
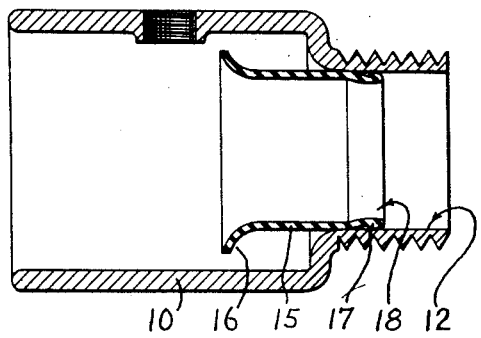
Figure 3:
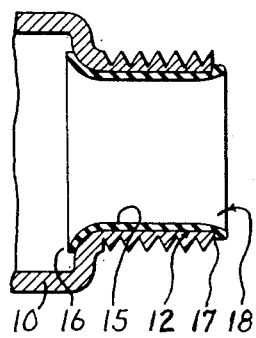
Figure 4:
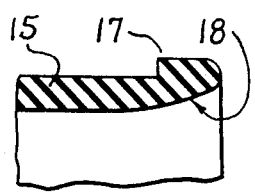
Figure 5:
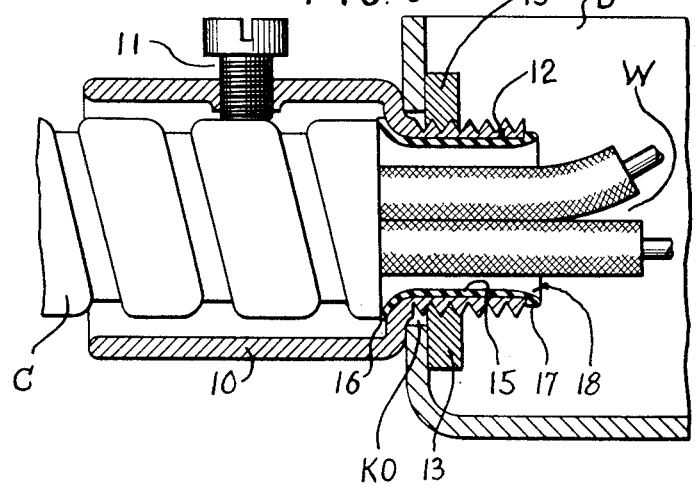
Figure 6:
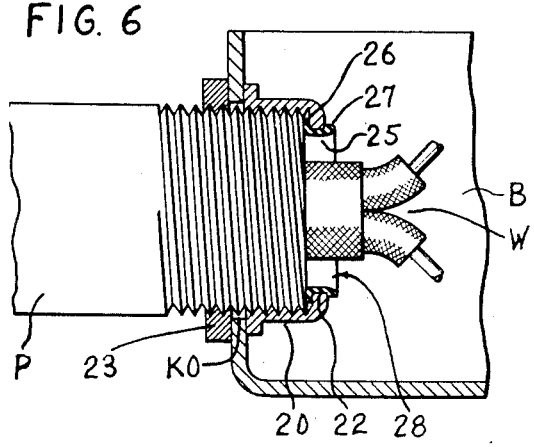
Figure 7:
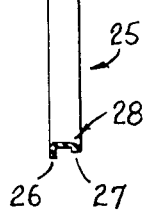
Figure 8:
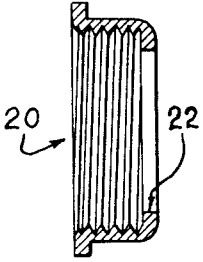

Note that Fig. 6 shows the utility of a new interlined metallic bushing used with thick-wall rigid conduit (pipe) in a raceway assembly and may be compared to Fig. 5. Also, Fig. 7 shows the bushing interliner pre-molded as in Fig. 1. In Fig. 8, a conventional metallic bushing is shown before improving it with the pre-molded seamless liner of Fig. 7.

Figure 9:
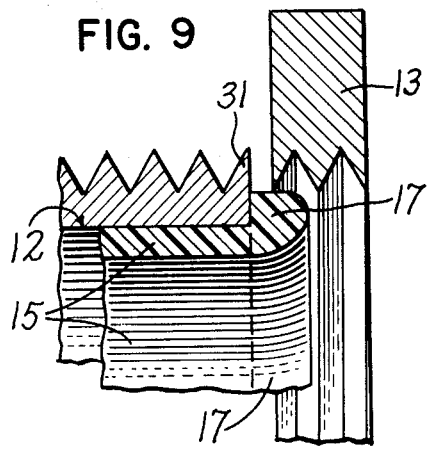

Fig. 9 is an action view demonstrating one of the functional advantages of the seamless dielectric end bead numbered 17 in parent Figs. 1-5. Such bead constitutes a thread-end finish and initially serves as a guide to pilot the first thread of a lock nut into starting registry with the first thread of the connector throat.

Figure 10:
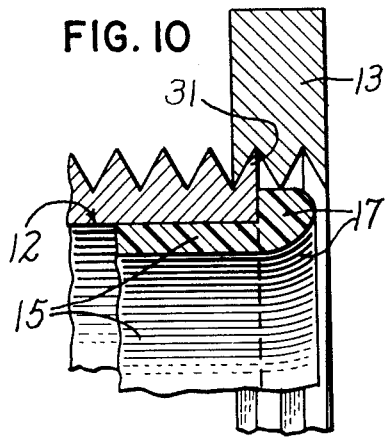

Fig. 10 shows that the seamless bead 17 has guided the rotating nut into first-thread engagement with the externally threaded connector, thus evenly and coaxially started.

Figure 11:
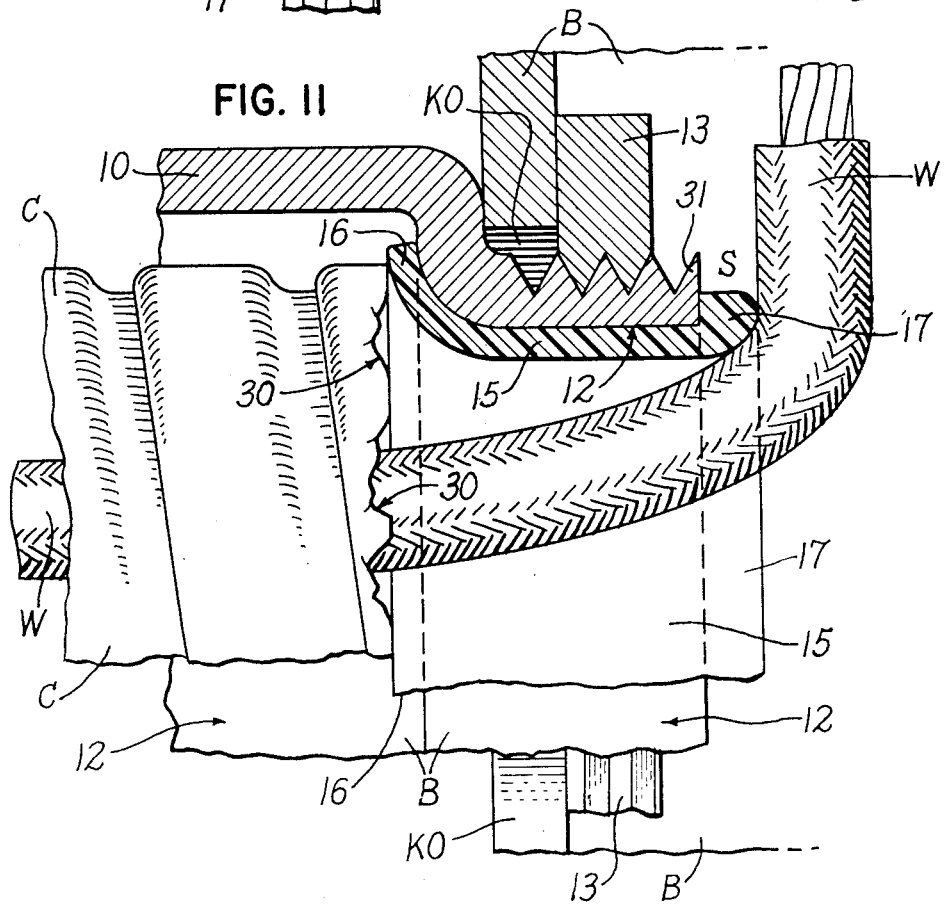

Fig. 11 is an enlargement of the tubular seamless liner (its portions numbered 15, 16 and 17), shown in parent Figs. 1-5 and is presented to help describe the several functional advantages which enhance and add to the three conventional functions heretofore noted (third paragraph herein).

This latter view shows that the installation of the metallic raceway components has been completed at the raceway box (as in Fig. 5), and that one of the insulation-covered wires is being bent, manipulated and tugged at, in the course of working in the box, such as making electrical connections therein.

The view also vividly demonstrates how the rim of the thread-end finishing bead 17 (as in Fig. 5) serves as a space barrier and guards the insulation-covering of the wires from rubbing and cutting against the first thread of the connector hub when the wiring mechanic is working in the box. In addition, this view prominently illustrates inherent functional advantages of the seamless throat 15 per se and of the rear end flange 16 per se.

*Continuation-in-part Figs. 12-22*

All views to follow show thread-end finish seamless beads comparable to the bead 17 of the parent case, as well as further improvements (equivalents) in ways and means for permanently integrating tubular insulating seamless liners to self-insulate conduit connectors.

Accordingly, Figs. 12 through 16 show a third species having a spline means for laminating a seamless tubular liner in metallic tubular body.

Fig. 12 shows a tubular body and liner in spaced relation before being permanently joined by the aforesaid spline means.

Fig. 13 is a greatly enlarged fragment of the metallic tubular body, in section on the line 13, showing its splined throat.

Fig. 14 is a greatly enlarged section on line 14 through the tubular liner before it is pressed into the metallic splines.

Fig. 15 shows the interlined connector mounted in a box and may be compared with Figs. 5 and 11. This view also shows a conventional anti-short bushing, which must be fitted by hand into the terminus of a spiral-armor conduit to mask its rough-cut burred end. The anti-short bushing as such is not structurally related to these several connectors but is involved in raceway work generally improved by this invention.

Fig. 16 is a section on the line 16 showing a fragment of the lined metallic tubular body or throat.

Fig. 17 shows a fourth species, comprising a screw-in means for permanently fixing a tubular liner within a rolled screw-threaded throat (counterpart inner and outer threads) and having a unique coaction therewith.

Fig. 18 shows a fifth species comprising a tubular liner which is molded in situ within a metallic throat.

Fig. 19 shows a sixth species comprising a tubular liner permanently fixed in a metallic throat by a pressure ring gripping the flanged rear end only of the liner, the inner end of which has a throated bead-end finish, being a modified equivalent of the parent bead 17.

Figure 20:
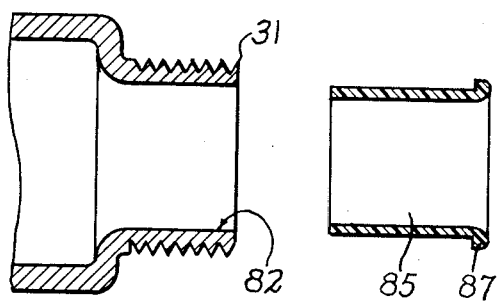
Figure 21:
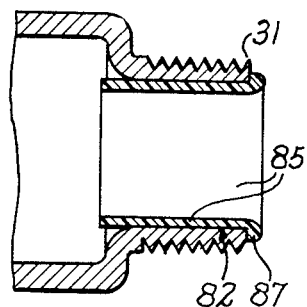
Figure 22:
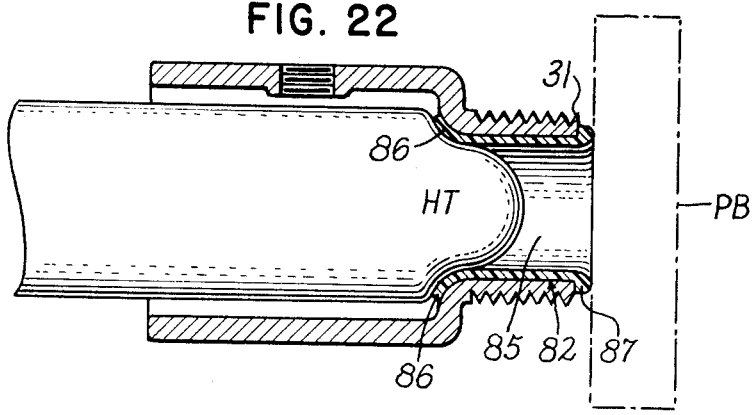

Figs. 20-22 show a seventh species, sometimes referred to as the "heat curling" method for fixing a semi-preformed tubular liner in a metallic throat, being an important equivalent of both parent liner flanges 16 and 26 (Sheet 1).

Fig. 20 shows separately the metallic throat and the semi-preformed liner with a straight rear end.

Fig. 21 shows the metallic throat, with the liner inserted therein.

Fig. 22 shows a heated forming tool set against the projecting straight rear end of the liner, heating the plastic, pressure flaring (heat curling) it outwardly, and thereby permanently wed-locking the liner into the metallic throat.

Figure 23:
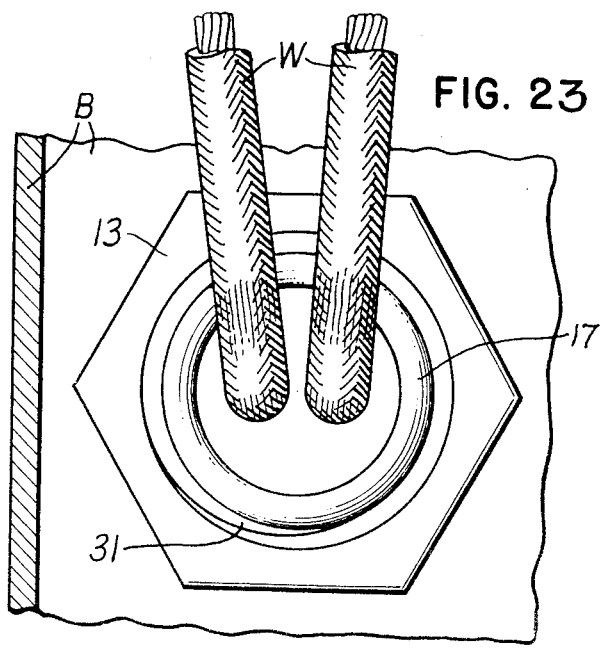

*Fig. 23 at the end applies to all species*

Specifically, Fig. 23 is a reduced size, front-end elevation of Fig. 11, taken inside of the raceway box, and looking into the inner open throat-lined connector.

The insulation-covered conductors are being roughly handled and pulled against the protective guard bead 17 which positively spaces the wiring from the metallic end-edge of the connector. This view, like Fig. 11, is common to and illustrative of the marked utility of all the fittings herein. The rough handling of the wiring (illustrated in these two views) is usually unavoidable under conventional practice when a workman is pulling it through a raceway and later manipulating the wires in a bunch or individually when making electrical connections. The two action views (Figs. 11 and 23) greatly aid an understanding of the numerous vantage points of the throat portion 15 as well as the flange and bead portions 16 and 17 of the parent liner. The functional utility is the basis of the invention and will be more fully recognized after a description of each species.

In the following topics, the several equivalent throated bead-end finishes are numbered 17, 27 (Sheet 1), 47, 57, 67 and 87 and thus mark the "shouldered" parent bead in all the drawings. Such bead is characterized by a square-set shoulder reaching around the annular sharp metallic inside corner edge of the metallic throat 12, sealing off said edge and, moreover, reaching radially outward and thus also sealing off the danger area of the end-edge surface. The skipped number 77a marks a "straight" bead (Fig. 19) of like functional utility.

*Raceway fittings of the connector type in Figs. 1 through 5*

A typical conduit or box connector embodies a metallic tubular body 10, thus of annular form. Some types have a set screw 11 at the rear (outer) end for securing a raceway conduit in the body, a BX cable or a flexible-metallic conduit C (spiral-armor) being shown as examples. Such fittings are also known as box and/or cable connectors. A large body type 10 with reduced size front hub end is chosen for illustrating the basic invention.

Connectors of this and other like types, if for large spiral-armor conduiting C, may have a reduced size wire-passage neck or hub, defining a metallic throat 12 at the front (inner) end of the tubular body 10. The interior throat surface 12 may lack a smooth finish and, moreover, the end-edge (rim surface) of the throat opening may be rough, due to metal burrs, tool marks, scratches, pits, or screw-thread slivers.

This type of connector is externally screw-threaded, and the first thread on its front end is unavoidably close to the exit rim where the wiring emerges, with the result that the insulation-covering is likely to strike this sharp thread. The first thread turn, at the end-edge of the open throat, appears to be as essential to this type of connector as it is a menace to the wiring; and the reference character 31 marks it throughout the new drawings (Sheets 2-5) herein.

It is the metallic rim surface—being the inner and outer corner or edge periphery of small annular area adjacent the first screw-thread 31 in all raceway fittings—that the insulation-covered wiring initially rubs, scrapes and may be damaged during installation and, subsequently, may wear (due to machine and building vibration) and become thin in the course of long service to shorten the life of the installation. It is at this resting point or conductor seat (see 12 in Fig. 2) where the wiring emerges from the protective run of the conduit C and enters a metallic raceway or wiring box B (Fig. 5).

Accordingly, conventional fittings create the major problem by providing the danger spot at the metallic surface 12, where the first hot-spot may be expected to occur when the electrical charge eventually leaks through and burns the worn and damaged insulation-covering. This results in the current short-circuiting into the box B, the raceway run C, and thence grounding to earth.

The screw-threaded hub 12 has a lock or jam nut 13 which secures the connector 10 and conduit C within a knockout opening KO of the box B. Note that the set screw 11 is merely one known fastening means for the cable C, and that other fastening means may be used, depending upon the type of raceway and also upon the ground means (not shown) of the system. Irrespective of conduit types, it follows that conventional insulation-covered live conductors, circuit wiring W, extend from the raceway run C into the box B.

Fig. 5 demonstrates the utility of one form of conventional fitting (box connector 10), which this invention seeks to improve, in respect to its typical metallic throat 12, by lining, masking, smoothing, and insulating its rough throat surface and, more importantly, its end-edge exit rim, being the terminus of the raceway. There are other throated types to which the invention is adapted, the foregoing views being exemplary thereof.

More specifically, Figs. 1-5 show a pre-formed tubular liner 15 of insulating material, comprising a thin-wall cylinder or sleeve of continuous, imperforate, and full-fashioned seamless form. That this tubular liner is not mutilated by a cut or slit and not made with latching tabs (so frequently employed in the art) is an important feature. Also, the liner 15 has an external diameter which adapts it to a tight fit within the metallic throat 12. It is important, as shown, that the inside diameter of the liner 15 be larger than the insulation-covered wires W, since all conductors must be loose and free within the raceway C and its connector 10.

An annular external flange 16 is also seamless and is integrally formed on the rear end of the dielectric tubular liner 15, and it has a diameter somewhat larger than the inside diameter of the metallic throat 12. The large insulating flange 16 is shown with a diameter comparable to that of the conduit C. Thus, when the liner 15 is permanently integrated within the throat, the end of the screw-fastened conduit C abuts the flange 16 and is masked by it (see Fig. 5).

Next, an annular external bead 17, also seamless, is integral with the front end of the liner 15. This bead has a limited outside diameter fractionally greater than the inside diameter of the forward or front end-edge (rim) of the open metallic throat 12. The seamless beaded end 17 has a smooth surface annular internal chamfer 18 (outwardly flared taper, see Fig. 4) which is adjacent to and within or proximate the plane of the bead. This internal rim chamfer 18 provides a unique flexing perimeter and allows the beaded end—by reason of this thin-wall annular resilient zone 18—to contract and be forced through and integrated within the metallic throat 12.

Accordingly, the tubular liner 15 is laminated within the tubular metallic body 10, by starting the beaded front end 17 into the flared rear end of the metallic throat 12. As pressure is applied to the flanged rear end 16 (by an assembling tool not shown), the beaded and chamfered end 17, 18 annularly flexes and gives inwardly by radial compression at the resilient zone 18, thus temporarily reducing the bead 17 diameter to that of the inside of the metallic throat 12, as the tubular liner slides therethrough.

When pushed through, the radial compression reacts, and the seamless bead 17 expands and permanently snap-locks against the end-edge of the metallic throat. The two seamless end portions 16 and 17 thus act to shoulder-lock the liner throat portion 15 in the throat. In addition, the outside diameter of the throat portion 15 has a close slide-in pressure fit within the metallic throat 12. Thereby, the inner metallic surface-roughness of the throat establishes a permanent frictional grip on the liner.

The important point is that the fractionally oversize annular bead 17 overlaps the inner sharp circular corner edge of the throat, masks and seals off its burr roughness, and forms a non-metallic rim as a resting seat and rub area for the wiring W. Of equal importance is the axial thickness of the bead 17 as, for example, the thickness as proportioned in the drawings. The bead, therefore, projects forward of and beyond the first thread 31 (new drawings) a distance about equal to the thread pitch, thus setting off a guard space S (Fig. 11) as a barrier which prevents the wiring from striking the first thread 31. Among other things, the bead also forms a neat throat-end and also thread-end finish, which distinguishes these connectors.

A suitable material for the several liners herein comprises a semi-rigid insulating plastic similar to cellulose acetate. A type of plastic should be chosen for its firm resiliency, in order to compressively reduce under pressure when laminating the liner 15 into the metallic throat 12, also for its toughness to withstand rugged use, and should have a good wear-resisting surface, as well as a low coefficient of friction. Such a plastic has a firm bodily give and cushioning effect absorptive of impact.

The plastic bead-end finishes 17, 27, 47, etc., for the front ends of any and all metallic throats (being softer than iron or steel—more nearly the softness of the insulation-covering on the wiring), will not abrade or wear the covering such as is experienced with metallic throats. The polishing and smoothing finish of metallic beads adds to manufacturing costs, leaves tool marks and scratches which produce latent injury in the insulation-covering.

The rigid-conduit bushing in Figs. 6, 7 and 8

The foregoing description of the seamless tubular liner 15 also applies in principle and structure to conventional metallic bushings for thick-wall rigid metallic conduit (pipe), i.e., for terminating and connecting same with raceway wiring boxes.

In this second example of the invention, the bushing parts are designated by part numbers in the "twenty" series, with digits arranged comparable to like parts of the connector 10 designated by numbers in the "ten" series.

A typical conduit bushing embodies a metallic body 20 (Fig. 8), thus of annular form, comparable to the connector body 10 or its metallic throat 12. Such a bushing has an internal annular lip, defining a reduced exit rim, in the form of a metallic throat 22 at its front end. The surface and the two corner edges of this throat rim 22 are usually rough and burred or sharp and constitute the danger point similar to the metallic throat 12. It is this conventional metallic bushing 20 which the invention improves for the purpose of enhancing the utility of rigid-conduit raceway work.

The metallic bushing throat 22 is permanently lined (rimmed) with a seamless full-fashioned ring-like tubular insulating liner 25 (Fig. 7), having an annular external seamless flange 26 at its rear end. A like but smaller diameter bead 27 and annular inner chamfer 28 are formed at the front end. This liner 25 is integrated by shoulder-locking it within the metallic throat 22 in the same manner as heretofore described for the tubular liner 15. The structure and manufacturing technique are the same for both. The completed two-part (composite) bushing 20, 25 is shown in the raceway (Fig. 6) assembly.

Accordingly, Fig. 6 shows the conventional use of rigid conduit (pipe) P in raceway work, as modified by this invention. The threaded end of the pipe P is mounted in a knock-out hole KO of a raceway wiring box B. After the lined bushing 20, 25 is screwed home, an outside jam nut 23 is screwed up tightly against the box. Thus the rear end of the bushing 20 inside the box and the nut 23 on the outside thereof grip the box wall between them and close the KO hole.

Accordingly, the bushing 20, 25 and nut 23 constitute a two-part box connector when rigid conduit P with threaded end is used for the raceway run, not unlike Fig. 5 where spiral-armor is employed. Although not numbered, the screw-threaded end of the pipe (Fig. 6) also has its first thread, as at 31 (Fig. 11). The insulation-covered wiring W is next fished and dragged through the raceway run P, out through the dielectric throat 25 of the bushing 20, and into the box B, thus in readiness for making electrical service connections.

The liner 25 seals off the metallic throat 22. It also slightly reduces the throat diameter, by which to guide and center the wiring W up and axially away from the threaded pipe end. Moreover, the rear flange 26 masks (seals off) the ever present pin-like metallic slivers and inner rough-corner sharpness always left on a pipe end which has been cut and screw-threaded.

In addition, the front end bead 27—by reason of extending beyond the metallic rim 22—forms a barrier which sets off a guard space between the wiring W and the front surface of the metallic bushing 20. In Fig. 11, this guard space is marked S adjacent the liner bead 17 of the Figs. 1–5 connector.

Accordingly, it is appreciated that the insulation-covering is protected against metallic pricks and abrasions when the wiring W is being initially dragged through the pipe P and being subsequently manipulated and twisted in course of working in the box B to complete the installation. The ring liner 25 thus prevents damage to the wiring during its rough handling.

After the bent wiring is straightened out, restored to service position in the box B, the current turned on, and the installation goes into long service, it follows that the wiring W gradually settles and rests (seats) against the ring liner 25. Vibration of a building and/or machinery may induce a rubbing contact of the wiring W against the metallic exit throat 22 of conventional metallic bushings 20 (Fig. 8), thus gradually wearing and thinning down the insulation-covering after years of service and eventually resulting in current leakage and short circuit.

In contrast to that old practice, the plastic liner 25 provides a non-wear throat and edge seat for the conductors at this critical point in the raceway and increases the life of the installation.

*Minimizing short circuit and grounding hazards*

In the first form of the invention (Fig. 5), it will be understood how (in conventional practice), the set screw 11 and lock nut 13 provide for the required electrical-ground connection (metal-to-metal contact) between the long conduit run C of the raceway and its components 10 and B. In the second form (Fig. 6), the same is true in respect to the raceway components P, B, 20 and 23. Therefore, the raceway parts in Figs. 5 and 6 constitute "electrical connectors" in a latent conductive circuit which, it is to be hoped, may never be called into play.

The grounding-conductive conduits C and P are, of course, connected to the earth somewhere in the system. Conventional practice of resting the charged conductors W on the metallic throat rims 12 and 22 (Sheet 1) creates a hazard, but known forms of effective grounding electrical connections between the metallic parts reduces it. To do so, conventional practice adds another fitting (not shown). It is a "ground connector" which (without reliance on the lock nuts 13, 23 and other parts) makes certain that a short circuit is grounded to the earth—thus to minimize the intensity of an electrical arc or flame if and when it occurs, at the danger spots 12 and 22.

In effect, therefore, conventional practice begets the hazard, then adds a "ground connector" to minimize it, and thereafter repairs the circuitry and the raceway after damage occurs. This invention seeks to correct the fault at its root (the current-conductive throats 12 and 22), thereby to lessen the need for the additional grounding accessories creating further problems, and to so foolproof the circuitry that "grounding" as such does not occur. Accordingly, the "ground connector" is omitted from the assemblies (Figs. 5 and 6) in the interest of clarity of illustration of the inventive features.

As the art advances and electrical raceways improve, the likelihood of misoperation and accident to enclosed power circuits diminish, thus reducing the hazards of an accidental electrical charge on metallic raceways to endanger life by electrocution and property by fire. The metallic terminus 12 and 22 (Figs. 2 and 8) are the telltale hot-spots in an installation, where the initial injury they cause to the wiring is eventually manifested by a harmful short circuit.

It is as simple as important, therefore, that one solution of the problem lies in making the throat rims 12 and 22 dielectric (non-metallic). Thus, the improvements herein are proposed as a step forward in raceway work, toward that time when requirements for grounding accessories may be modified.

*Figs. 9, 10, 11 and 23 demonstrate functional advantages*

These views are to be read with and as a part of Figs. 1 through 5, from which they are made, and they include the same part numbers.

These diagrams emphasize discovered importances of the parent concept latent in the seamless end portions 16 and 17 and of the liner throat portion 15. The functional advantages subsequently discovered in and for these elements of the liner are inherent and of such importance that they characterize the several new species of this invention, beginning with Fig. 12.

Several newly discovered advantages are now time-proven and distinctly in addition to their "shoulder-locking" function which integrates the tubular liner 15 within the metallic throat 12. The latter function was the only one appreciated at the time and described in the parent case. The additional inherent functions were discovered in the course of making the further improvements herein and also in manufacturing fittings for the trade.

As to the rear end flange 16 per se, it is simple in structural form and is additionally advantageous in rimming a conventional rough-cut jagged annular end 30

(Fig. 11) of the raceway conduit to mask it, especially so when the flexible spiral-armor conduiting C is used in assembling a raceway.

As to the front end bead 17 per se, it is of versatile utility, characteristically rimming the metallic end-edge of the throat 12, isolating the first screw-thread 31 (Fig. 9 and subsequent views), and setting off a guard space marked S (Fig. 11) between the insulation-covered wiring W and the metallic throat 12.

Note also that the outside diameter of the bead 17 (Fig. 9) is not greater than the root-diameter of the external screw-threads 31 of the connector hub, thus not greater than the crest-diameter of the internal screw-threads of the lock nut 13. By reason of this simple relation, the bead acts as a starting guide for the nut (Figs. 9 and 10).

Note the above numbers 30 and 31, and the letter S, are the first new reference characters herein. They are helpful in describing the numerous functional advantages of the seamless end portions 16 and 17 per se of the liner throat 15, as well as comparing the new liner with a conventional "anti-short" bushing, as exampled in Fig. 15.

*Compare throat 15 and flange 16 to an anti-short bushing*

This topic explains two of the newly discovered functional advantages inherent in the portions 15 and 16 per se of the tubular liner, and which are distinct from and in addition to the "shoulder-locking" function of the flange 16 described in the parent case. Taking the flange 16 alone, two new points of vantage are noted: first, its "anti-short" bushing utility; and second, its "wire-piloting" convenience to a workman of the job.

The first point: It is well known that spiral-armor conduiting C usually has a rough and burr jagged end, resulting from cutting a spiral-armor steel ribbon at an angle and breaking it, else hacksawing the armor partway around and then breaking it, to obtain a selected length thereof for insertion into the connector 10. The number 30 (Figs. 11 and 15) marks a badly haggled-off BX cable end. It is in contrast to the neat straight cut shown in Fig. 5 which failed to portray a typical example when the parent cast was filed in 1951.

The burred end-edges 30 (or a single sharp metallic point) may scrape and damage the insulation-covering of the wiring W, thus starting deterioration. To correct this fault, what is known in the trade as an anti-short bushing (not shown in the parent drawings) is required to be manually fitted into the burred end 30 (whether crudely or neatly cut), over and around the wires, to mask and isolate them from the rough end 30. The anti-short bushing comprises a red-colored fiber sleeve-like fitting which must be stocked, handled and installed as a separate part. It is indicated in a general way (Fig. 15), where its skirt 49a holds a flanged head 49 in place.

It is noted that the rear end flange 16 of the new liner herein compares with the head 49 of the anti-short bushing. Thus, when the end of the conduit C, whether a neat straight cut (Fig. 5) or a haggled-off fractured break 30 (Figs. 11 and 15) is pushed into the connector 10 and up against the flange 16, it follows that the rough metallic end 30 is rimmed and masked, and the wiring W is protected by the flange 16, not unlike the anti-short bushing head 49.

Observe, therefore, that the tubular liner (Fig. 1) is similar to the anti-short bushing in these two respects: (1) the throat portion 15 bears similarity to and performs the holding function of the skirt 49a of the anti-short bushing, and (2) the large flange portion 16 is similar in form and purpose to the masking rim or head 49 of the anti-short device.

The second point: The outward flare (Fig. 1), from the lesser diameter of the throat portion 15 to the flange perimeter 16, provides a funnel-shaped entry and aids in piloting the blunt-end wires W into the throat portion 15, when fishing them into the cable connector (Fig. 5). Also, the reduced diameter of the throat portion 15 centers the wires away from the rough edge 30 of the conduit C, a feature believed to be a third point which should also be assigned to the "anti-short" function pointed out in the preceding paragraphs.

Thus, in vantaged contrast to the anti-short bushing, it is seen that the tubular liner (as used in Figs. 5 and 11) serves more purposes: (a) lines the metallic throat 12, (b) is a captive (built-in) part not handled, (c) pilots the wiring through the connector and into the box, (d) centers the wiring away from the periphery of the conduit rough end 30, and (e) masks the end 30. On the other hand, the utility of the conventional anti-short bushing is understood to be limited to the last purpose (e) only.

*Figs. 12–16 show splined lamination*

This third example of the invention provides a novel means of laminating a straight rear end tubular liner 45 in a metallic throat 42 for protecting the insulation-covered wiring W at the raceway terminal box B.

The numbered parts are in the 40 series, the last digit of which is the same as in parent Figs. 1–5, where the parts are the same in the two species. All the lettered parts are the same. Accordingly, the previous description of Figs. 1–5 also applies here and is not repeated for parts which are common to both species.

Now, as to the novel features: It is observed that the metallic throat 42 is provided with longitudinal splines 44 (sharp edge V-ribs or teeth) spaced apart around the interior surface. A dielectric tubular liner 45 has an annular external bead 47. This modified liner 45 has a straight rear end, and thus it lacks the flange 16 of the parent liner.

The liner 45 is permanently laminated into the splined throat 42 by pressing their rear and front ends together. The sharp splines 44 cut into the peripheral surface of the tubular liner 45 and establish a permanent pressure grip (a bite) on the liner, thereby permanently integrating it into the metallic throat as a dielectric laminate lining therein.

It is noted that the rear end of the liner 45 stops short of extending through the rear end of the metallic throat 42 and that it lacks the flaring feature of the parent flange 16. Accordingly, it is seen that the rear end of the liner 45 does not mask the rough burred end 30 of the spiral-armor conduit C (Fig. 15). By reason thereof, it follows that the rough end 30 is fitted with a conventional anti-short bushing. The skirt 49a (dotted lines thereof) embraces the wiring W to hold the head 49 of this bushing in place for masking the rough end 30.

Comparison of the two liners 15 and 45 emphasizes the importance of the parent flange 16 and its novel functional advantage in simplifying the wiring work of spiral-armor. This invention is proposed as a means of modifying the present-day requirements involving the use of anti-short bushings.

*Note.*—A brief description of the novel structural features is next made of the four additional species. The functional advantages previously explained, which apply to those species, are not repeated in the following.

*Fig. 17 shows a screw-fastened liner*

This fourth example of the invention enables the manufacturer to produce conduit connectors having throats made of light weight thin sheet metal, thus of lighter gage than in conventional practice and, therefore, has a further advantage in the economy of material.

A thin metallic throat has rolled screw-threads, the inner thread (throat) of which is marked 52 and the outer thread is 53. The principle of the invention is well adapted to this conventional form of rolled screw-threads.

A dielectric tubular liner is formed with a thicker wall than the rolled thread metallic throat 52, 53 and has external threads 55 adapted to be screwed into the thin threaded metallic throat 52. Note that the threads 55 of this tubular liner are equal in number to the metallic throat threads 52. The liner 55 also has its characteristic thread-end finish in the form of an annular external bead 57, the same as the parent bead 17. The bead 57 is defined by an annular shoulder 58 in a plane at right angles to the axis of the liner.

The rolled screw threads 52, 53 of ultra thin stock make a rather flexible throat axially, accordion fashion. Such thin sheet metal is not ordinarily used when rolling screw-threads which must withstand the pressure and tension of a lock nut 13 (parent Fig. 5). However, by adopting the features of this novel liner 55, it is possible to use thin-gage stock sheet metal for the connector throat.

When the tubular liner 55 is screwed into the rolled thread metallic throat, it follows that the first thread thereof (the rear end) extends through the first thread at the rear end of the metallic throat 52. The tubular liner 55, therefore, stiffens and so reinforces the thin metallic throat that it is no longer susceptible to longitudinal expansion and contraction, accordion fashion. The liner 55 so strengthens the rolled thread metallic throat that its screw-threads 52, 53 are rigidly set and withstand the tension which builds up when the pressure of a lock nut 13 tightens against a box wall.

Any metallic unevenness or roughness which may exist on the end-edge of the rolled thread throat beyond its first thread 31, penetrates the bead shoulder 58 and is thereby sealed in and masked by this shoulder. Such unevenness is gripped by the shoulder 58 and provides a lock-washer effect to prevent possible loosening of the tubular liner in the throat of the connector after the two are tightly set together in permanent and final screw-threaded assembly.

*Fig. 18 shows a liner molded in situ*

In this fifth example, a conduit connector has a metallic throat 62. It is dielectrically lined by molding in situ a seamless insulating tubular throat portion 65, with an integral rear flange 66, and an annular external bead 67, constituting a neat and protective finish at the end-edge or rim of the fitting.

This molding method is facilitated by reason of the tubular body of the connector acting as an external or female die which forms and sets the plastic to it, together with a male forming die centered within the tubular body and which completes the formation of all the liner portions 65, 66 and 67, having the functional advantages enumerated in the summary topic herein.

*Fig. 19 shows a ring-locked liner*

This sixth example differs in that its pre-formed tubular liner has a straight front end with a modified form of end-finish bead. As usual, a conduit connector is shown with a metallic throat 72.

A dielectric tubular liner is pre-formed with its throat portion 75 and rear flange portion 76. The throat 75 is uniformly cylindrical at its front end and slightly longer than the metallic throat 72. It thus projects beyond the front end-edge of the metallic throat 72 and forms an annular external bead 77a, having an outside diameter the same as the inside diameter of the metallic throat 72.

A pressure-fit lock ring 79 is pushed into the tubular body 70 from its rear end and permanently set tightly against the rear end flange portion 76, thus locking the tubular liner 75 in position and holding the bead-end finish 77a in the position shown. This lock-ring 79 is preferably made of insulating material.

*Figs. 20–22 show a liner flange 86 heat and pressure formed in situ*

This seventh example of the invention is characterized by providing a partially pre-formed dielectric tubular liner which subsequently is heat-formed in situ to self-insulate the throated fitting.

A conduit connector is shown with a metallic throat 82, same as in previous examples. A tubular liner is semi-preformed with a straight rear end throat portion 85, which is longer than the metallic throat 82, and also pre-formed with a front end-finish bead 87 similar to the parent bead 15 (Sheet 1). Compare the lengths of the metallic throat 82 and tubular liner 85 (Fig. 21).

The partially pre-formed liner 85, 87 is inserted into the metallic throat 82 from the front end of the latter. Therefore, the straight rear end projects through the metallic throat, as shown (Fig. 21). This sets the bead 87 against the end-edge rim of the metallic throat, in the same fashion as the parent bead 15.

A heated tool HT has a contoured-forming end which matches the flared shape of the rear open end of the metallic throat 82 (Fig. 22). The tool is pressed against the projecting straight rear end of the linear throat 85, while a pressure block PB sets tightly against the pre-formed front end 87 of the liner. The tool is pressed against the rear end of the line, flares it outwardly, heat curls and molds it tightly against the rear flared shoulder rim of the throat 82, thereby forming a rear end flange 86 which is equivalent to the parent flange 16.

This method and type of construction have the advantage of tightly sealing (wed-locking) the two ends of the dielectric tubular liner 85 into the metallic throat 82. They have the further advantage of compensating for fractional variations in length (tolerance) which may exist in the metallic throats 82 of a large number of connectors being self-insulated.

This disclosure explains the principles of the invention and the best mode contemplated in applying them, so as to distinguish the invention from others; and there is particularly pointed out and distinctly claimed the part, improvement or combination constituting this discovery as understood by a comparison thereof with the prior art.

What is claimed is:

1. An electrical-raceway throated fitting, through which conductor wiring having insulation-covering is adapted to loosely extend, consisting of an annular body, having a metallic throat; an insulating tubular liner having a pressure fit within said metallic throat, and being formed of semi-hard tough and resilient plastic, of larger inside diameter than said conductor wiring, with a thin-wall formation, of continuous, seamless, cylindrical form, and having an outside diameter making said pressure fit within said metallic throat; and an annular external flange, integral with and at one extremity of the insulating liner, abutting one end of said metallic throat; also an annular external bead, of smaller diameter than the flange, integral with the insulating liner at its other extremity; the insulating liner being annularly and internally chamfered adjacent the bead, said internal chamfer constituting a flexing perimeter which, by contraction, permits the bead and insulating liner to be pressed into said metallic throat and which, by expansion, when the bead is pressed through said metallic throat, locks the tubular liner in the fittings, to permanently integrate said liner therein, and through which the conductor wiring is adapted to loosely extend.

2. An electrical raceway throated fitting as in claim 1, but in which said metallic throat is provided with metallic external screw-threads extending to its front end, with a nut adapted thereto for securing the fitting in a raceway box; and in which said annular external palstic bead projects beyond the first metallic thread, and forms a smooth insulating thread-end finish at the inner end thereof; the outside diameter of said bead being not greater than the crest diameter of the nut and thereby said bead forms a starting guide for rotatively piloting the first thread of the nut into starting registry with the first thread on said throat.

3. In a grounded raceway and insulated electrical wiring system, having metallic fittings which are electrically conductive and grounded to the earth, including a conduit, with a throated connector secured thereto, and external screw-threads on the front end of the connector, with a lock nut thereon for fastening and grounding the conduit and the connector in and to a wiring box, the screw-threads extending into the box, beyond the lock nut; also insulation-covered electrical wiring, loosely extending through the conduit and screw-threaded throat, the wiring being adapted to be pulled through the throat, into the box, out from the box, and into the open, thus being subjected to angular bending stresses when rubbing against the exposed threaded-end of the connector within the box, and hence subjected to wearing pressure against the first screw-thread, causing damage to said insulation-covering, at its danger point of emergence from the protective raceway; that improvement in the foregoing conventional system, for preventing the infliction of said damage at said danger point, and thus reducing the likelihood that said metallic fittings will be called upon, during the life of the wiring system, to conduct a short circuit to the ground; said improvement comprising an insulating sleeve, of full-fashioned and seamless form, lining the metallic throat within the connector, with a tight fit against the throat surface; an insulating-rim at the front end-edge of the metallic connector, integral with the insulating sleeve, contiguous with the first screw-thread, and encircling the insulation-covering at the danger point where the electrical wiring emerges from the protective raceway, thereby forming a space-barrier guard at said danger point, between said exposed first metallic screw-thread and the insulating-covering on the wiring; and means, at the rear of the insulating-rim, permanently securing the seamless insulating sleeve in the metallic throat, thereby securing the insulating-rim in place at said front end-edge of the metallic connector; by which the angular bending stresses and rubbing pressure, when pulling the wiring through, occur against said insulating-rim, thus avoiding said damage during installation of the electrical wiring in the raceway; and which insulation-covering also rests against the seamless insulating sleeve in the throat after the installation and thus during service, when the wiring is current charged, thereby avoiding wear due to vibration; the electrical wiring thus being double-insulated, at said danger point, from said metallic connector, by the combined thickness of the insulation-covering on the wiring and the seamless insulating sleeve within the throat, and thereby providing frictionless engaged surfaces of said insulation-covering and said seamless insulating sleeve.

References Cited in the file of this patent

UNITED STATES PATENTS

| | | |
|---|---|---|
| 673,656 | Krantz | May 7, 1901 |
| 1,857,197 | Knoderer | May 10, 1932 |
| 2,054,887 | Segler | Sept. 22, 1936 |
| 2,222,438 | Manson | Nov. 19, 1940 |
| 2,268,060 | Rhode | Dec. 30, 1941 |
| 2,447,749 | Hallett | Aug. 24, 1948 |
| 2,628,264 | Esher | Feb. 10, 1953 |
| 2,657,251 | Bergan | Oct. 27, 1953 |

FOREIGN PATENTS

| | | |
|---|---|---|
| 106,990 | Australia | Mar. 20, 1939 |